(12) United States Patent
Ghafourifar et al.

(10) Patent No.: US 11,573,990 B2
(45) Date of Patent: Feb. 7, 2023

(54) SEARCH-BASED NATURAL LANGUAGE INTENT DETERMINATION

(71) Applicant: Entefy Inc., Palo Alto, CA (US)

(72) Inventors: Alston Ghafourifar, Los Altos Hills, CA (US); Mehdi Ghafourifar, Los Altos Hills, CA (US)

(73) Assignee: Entefy Inc., Palo Alto, CA (US)

( * ) Notice: Subject to any disclaimer, the term of this patent is extended or adjusted under 35 U.S.C. 154(b) by 275 days.

(21) Appl. No.: 16/905,830

(22) Filed: Jun. 18, 2020

(65) Prior Publication Data

US 2021/0073254 A1 Mar. 11, 2021

Related U.S. Application Data

(63) Continuation of application No. 15/858,876, filed on Dec. 29, 2017, now abandoned.

(51) Int. Cl.
| | |
|---|---|
| *G06F 7/00* | (2006.01) |
| *G06F 16/332* | (2019.01) |
| *G06F 40/253* | (2020.01) |
| *G06F 16/33* | (2019.01) |
| *G06F 40/117* | (2020.01) |
| *G06F 40/205* | (2020.01) |

(52) U.S. Cl.
CPC ...... *G06F 16/3329* (2019.01); *G06F 16/3334* (2019.01); *G06F 16/3344* (2019.01); *G06F 40/117* (2020.01); *G06F 40/205* (2020.01); *G06F 40/253* (2020.01)

(58) Field of Classification Search
CPC ............. G06F 16/3329; G06F 16/3334; G06F 16/3344; G06F 40/253; G06F 40/205; G06F 40/117

USPC .................................................. 707/600–899
See application file for complete search history.

(56) References Cited

U.S. PATENT DOCUMENTS

| | | |
|---|---|---|
| 5,481,597 A | 1/1996 | Given |
| 5,951,638 A | 9/1999 | Hoss |
| 6,101,320 A | 8/2000 | Schuetze |
| 6,950,502 B1 | 9/2005 | Jenkins |

(Continued)

FOREIGN PATENT DOCUMENTS

| | | |
|---|---|---|
| WO | 9931575 | 6/1999 |
| WO | 2013112570 A1 | 8/2013 |

*Primary Examiner* — Isaac M Woo
(74) *Attorney, Agent, or Firm* — Haynes and Boone, LLP

(57) ABSTRACT

Improved intelligent personal assistant (IPA) software agents are disclosed that are configured to interact with various people, service providers, files, and/or smart devices. More particularly, this disclosure relates to an improved Natural Language Processing (NLP) Intent Determination Service (IDS) that is able to determine the likely best action to take in response to generic user commands and queries. The improved NLP IDS disclosed is said to be 'search-based' because, rather than attempt to parse incoming user commands and queries up front, the incoming user commands and queries are searched against a pre-generated database of exemplary user commands (e.g., having associated action or parsing identifiers) to determine the most relevant search result(s). The associated system actions and known grammar/parsing rules of the most relevant search result(s) may then be used to process the incoming user command or query—without having to actually parse the incoming user command or query from scratch.

20 Claims, 10 Drawing Sheets

(56) References Cited

U.S. PATENT DOCUMENTS

| | | |
|---|---|---|
| 7,450,937 B1 | 11/2008 | Claudatos |
| 7,673,327 B1 | 3/2010 | Polis |
| 7,886,000 B1 | 2/2011 | Polis |
| 7,908,647 B1 | 3/2011 | Polis |
| 8,090,787 B2 | 1/2012 | Polis |
| 8,095,592 B2 | 1/2012 | Polis |
| 8,108,460 B2 | 1/2012 | Polis |
| 8,112,476 B2 | 2/2012 | Polis |
| 8,122,080 B2 | 2/2012 | Polis |
| 8,156,183 B2 | 4/2012 | Polis |
| 8,281,125 B1 | 10/2012 | Briceno |
| 8,296,360 B2 | 10/2012 | Polis |
| 8,433,705 B1 | 4/2013 | Dredze |
| 8,438,223 B2 | 5/2013 | Polis |
| 8,458,256 B2 | 6/2013 | Polis |
| 8,458,292 B2 | 6/2013 | Polis |
| 8,458,347 B2 | 6/2013 | Polis |
| 8,468,202 B2 | 6/2013 | Polis |
| 8,521,526 B1 | 8/2013 | Lloyd |
| 8,959,156 B2 | 2/2015 | Polis |
| 9,875,740 B1 | 1/2018 | Kumar |
| 2002/0133509 A1 | 9/2002 | Johnston |
| 2002/0152091 A1 | 10/2002 | Nagaoka |
| 2002/0178000 A1 | 11/2002 | Aktas |
| 2002/0194322 A1 | 12/2002 | Nagata |
| 2004/0117507 A1 | 6/2004 | Torma |
| 2004/0137884 A1 | 7/2004 | Engstrom |
| 2004/0243719 A1 | 12/2004 | Roselinsky |
| 2004/0266411 A1 | 12/2004 | Galicia |
| 2005/0015443 A1 | 1/2005 | Levine |
| 2005/0080857 A1 | 4/2005 | Kirsch |
| 2005/0198159 A1 | 9/2005 | Kirsch |
| 2006/0193450 A1 | 8/2006 | Flynt |
| 2007/0054676 A1 | 3/2007 | Duan |
| 2007/0130273 A1 | 6/2007 | Huynh |
| 2007/0237135 A1 | 10/2007 | Trevallyn-Jones |
| 2008/0062133 A1 | 3/2008 | Wolf |
| 2008/0088428 A1 | 4/2008 | Pitre |
| 2008/0261569 A1 | 10/2008 | Britt |
| 2009/0016504 A1 | 1/2009 | Mantell |
| 2009/0119370 A1 | 5/2009 | Stern |
| 2009/0177744 A1 | 7/2009 | Marlow |
| 2009/0181702 A1 | 7/2009 | Vargas |
| 2009/0271486 A1 | 10/2009 | Ligh |
| 2009/0292814 A1 | 11/2009 | Ting |
| 2009/0299996 A1 | 12/2009 | Yu |
| 2010/0057872 A1 | 3/2010 | Koons |
| 2010/0210291 A1 | 8/2010 | Lauer |
| 2010/0220585 A1 | 9/2010 | Poulson |
| 2010/0229107 A1 | 9/2010 | Turner |
| 2010/0323728 A1 | 12/2010 | Gould |
| 2010/0325227 A1 | 12/2010 | Novy |
| 2011/0051913 A1 | 3/2011 | Kesler |
| 2011/0078247 A1 | 3/2011 | Jackson |
| 2011/0130168 A1 | 6/2011 | Vendrow |
| 2011/0194629 A1 | 8/2011 | Bekanich |
| 2011/0219008 A1 | 9/2011 | Been |
| 2012/0016858 A1 | 1/2012 | Rathod |
| 2012/0209847 A1 | 8/2012 | Rangan |
| 2012/0210253 A1 | 8/2012 | Luna |
| 2012/0221962 A1 | 8/2012 | Lew |
| 2013/0018945 A1 | 1/2013 | Vendrow |
| 2013/0024521 A1 | 1/2013 | Pocklington |
| 2013/0097279 A1 | 4/2013 | Polis |
| 2013/0151508 A1 | 6/2013 | Kurabayashi |
| 2013/0262852 A1 | 10/2013 | Roeder |
| 2013/0267264 A1 | 10/2013 | Abuelsaad |
| 2013/0304830 A1 | 11/2013 | Olsen |
| 2013/0332308 A1 | 12/2013 | Linden |
| 2014/0270131 A1 | 9/2014 | Hand |
| 2014/0280460 A1 | 9/2014 | Nemer |
| 2014/0297807 A1 | 10/2014 | Dasgupta |
| 2015/0039887 A1 | 2/2015 | Kahol |
| 2015/0112971 A1 | 4/2015 | Wolfram |
| 2015/0186455 A1 | 7/2015 | Horling |
| 2015/0278370 A1 | 10/2015 | Stratvert |
| 2015/0281184 A1 | 10/2015 | Cooley |
| 2015/0286943 A1 | 10/2015 | Wang |
| 2016/0087944 A1 | 3/2016 | Downey |
| 2017/0024443 A1* | 1/2017 | Dayan ................ G06F 16/3344 |

* cited by examiner

SEARCH-BASED NATURAL LANGUAGE INTENT DETERMINATION

CROSS-REFERENCE TO RELATED APPLICATION

This application is a continuation of U.S. patent application Ser. No. 15/858,876, filed Dec. 29, 2017, and entitled "Search-Based Natural Language Intent Determination," which is related to the commonly-assigned and co-pending non-provisional patent application having U.S. patent application Ser. No. 15/396,503, filed Dec. 31, 2016, and entitled "Distributed Natural Language Message Interpretation Engine" (hereinafter, "the '503 application"), which is hereby incorporated by reference in its entirety.

TECHNICAL FIELD

This disclosure relates generally to apparatuses, methods, and computer readable media for improved natural language processing (NLP) intent determination, e.g., for use with intelligent personal assistant software agents that are configured to interact with people, services, and devices across multiple communications formats and protocols.

BACKGROUND

Intelligent personal assistant (IPA) software systems comprise software agents that can perform various tasks or services on behalf of an individual user. These tasks or services may be based on a number of factors, including: spoken word or verbal input from a user, textual input from a user, gesture input from a user, a user's geolocation, a user's preferences, a user's social contacts, and an ability to access information from a variety of online sources, such as via the World Wide Web. However, current IPA software systems have fundamental limitations in natural language processing, natural language understanding (NLU), and so-called "intent determination" in practical applications.

For example, in some systems, language context and action possibilities gleaned from user commands may be constrained 'up front' by identifying the specific service that the user is sending the command to before attempting to perform any NLP/NLU—thus increasing the accuracy of results and significantly reducing the amount of processing work needed to understand the commands. However, this strategy may not provide a satisfactory user experience in the context of AI-enabled IPAs, wherein the user may often engage in macro-level 'conversations' with his or her device via a generic query to a single IPA 'persona' that is capable of interacting with many third-party services, APIs, file, document, and/or systems. In such situations, it becomes more complex and challenging for the IPA to reliably direct the user's commands to the appropriate data, interface, third-party service, etc.—especially when a given command may seemingly apply with equal validity to two or more known third-party interfaces or services that the IPA software agent is capable of interfacing with. For example, the command, "Send {item}." may apply with seemingly equal validity to a native text messaging interface, a native email client, a third-party messaging interface, a flower delivery service, etc.

Moreover, it is quite computationally expensive to attempt to parse the grammar of each incoming user command or query 'up front,' i.e., to attempt to determine the intent of the user's command and/or which specific services, APIs, file, document, or system the user intends for his command to be directed to. Computationally-expensive parsing may also be used to determine how certain words or phrases in the user's command depend on, relate to, or modify other words or phrases in the user's command, thereby giving the system a greater understanding of the user's actual intent.

NLP systems may be used to attempt to glean the true intent of a user's commands, but the success of such systems is largely dependent upon the training set of data which has been used to train the NLP system. NLP also requires computationally-intensive parsing to determine what parts of the user's command refer to intents, which parts refer to entities, which parts refer to attributes, etc., as well as which entities and attributes are dependent upon (or are modifying) which intents.

The subject matter of the present disclosure is directed to overcoming, or at least reducing the effects of, one or more of the problems set forth above. To address these and other issues, techniques that enable a more computationally-efficient, so-called 'search-based,' NLP intent determination system are described herein.

DETAILED DESCRIPTION

Figure 1:
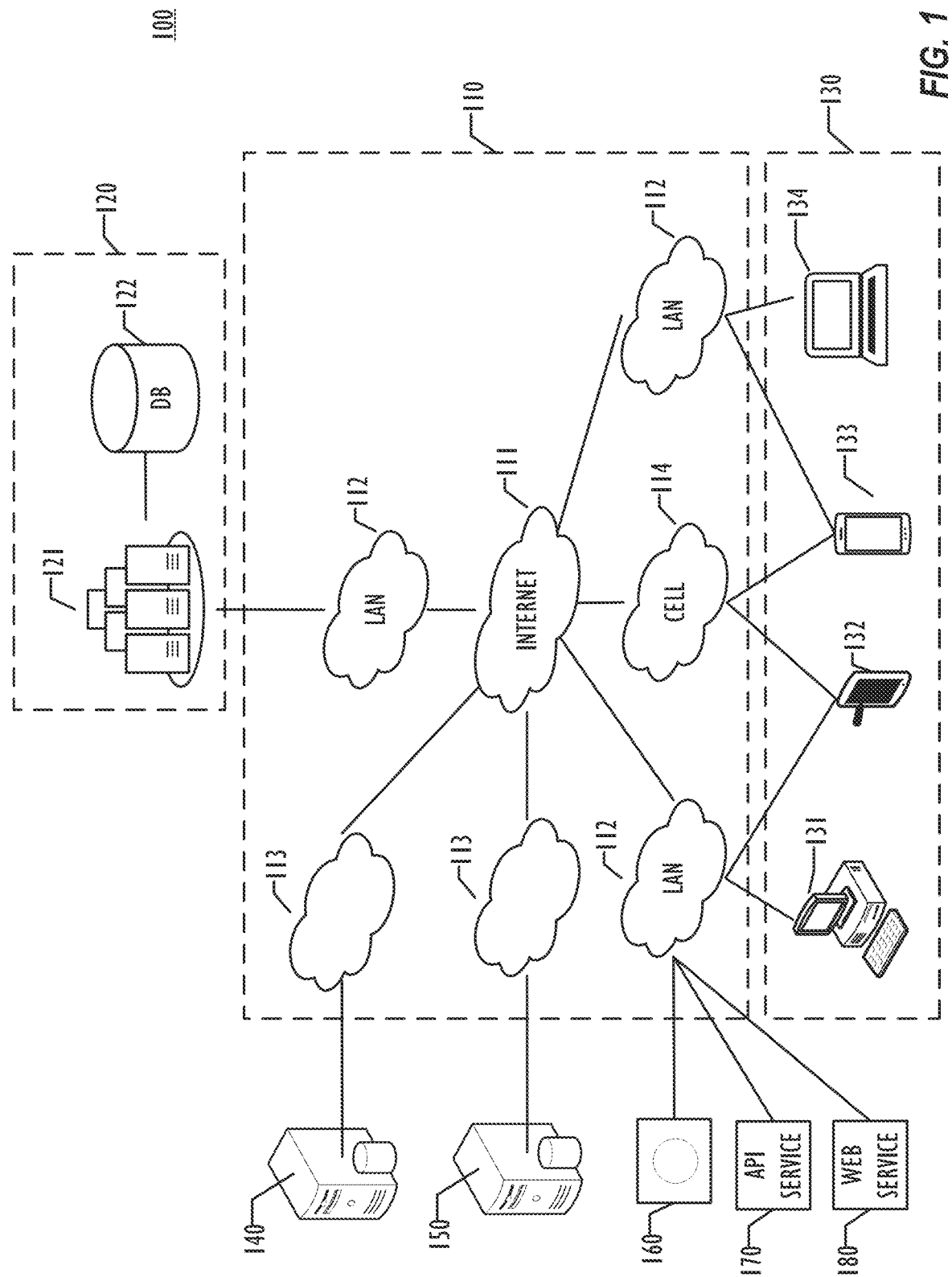
FIG. 1 is a block diagram illustrating a network architecture infrastructure, according to one or more disclosed embodiments.

Disclosed are systems, methods, and computer readable media for improved intelligent personal assistant (IPA) software agents that are configured to interact with various people, service providers, files, and/or smart devices across multiple communications formats and protocols in a seamless and intelligent fashion. More particularly, but not by way of limitation, this disclosure relates to systems, methods, and computer readable media for an improved NLP Intent Determination Service (IDS) that is able to determine the likely best action to take in response to generic user commands and queries (i.e., commands and queries that are not explicitly directed to a particular service endpoint, system, file, or smart device). The improved NLP IDS described herein is said to be 'search-based' because, rather than attempt to first parse incoming user commands and queries using language parsing techniques that attempt to break-apart and classify the input (e.g. using language rules, grammar structures, keyword triggers, pre-defined expressions, clustered word relationships, and so on), that is to say, parse the incoming user commands "from scratch," the incoming user commands and queries are instead presented to a search engine-style NLP intent determination system. As will be described in greater detail below, the search engine-style NLP system may be configured to ingest the input user command strings and perform "searches" of them against a pre-generated database of exemplary user commands and queries (each capable of having an associated system action identifier and/or parse identifier), in order to determine the most relevant search result(s). The associated system actions and known grammar/parsing rules of the most relevant search result(s) may then be used to process the incoming user command or query—without having to actually parse the incoming user command or query from scratch.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "system" or "computing system" refers to a single electronic computing device that includes, but is not limited to a single computer, VM, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

Referring now to FIG. 1, a network architecture infrastructure 100 is shown schematically. The infrastructure 100 includes computer networks 110, interaction platform devices 120 (e.g., devices implementing a centralized communications system that allows users' client devices to seamlessly interact with any number of other client or third-party devices via any communications protocol and/or format), client devices 130, third-party communications devices 140, third-party service provider devices 150, smart devices 160, third-party 'API-enabled' services 170, and third-party 'Web-enabled' services 180.

The computer networks 110 may include any communications network that allows computers to exchange data, such as the internet 111, local area networks 112, corporate networks 113, cellular communications networks 114, etc. Each of the computer networks 110 may operate using any number of network protocols (e.g., TCP/IP). The computer networks 110 may be connected to each other and to the various computing devices described herein (e.g., the interaction platform devices 120, the client devices 130, the third-party communications devices 140, the third-party service provider devices 150, the smart devices 160, the third-party 'API-enabled' services 170, and the third-party 'Web-enabled' services 180) via hardware elements such as gateways and routers.

The interaction platform devices 120 may include one or more servers 121 and one or more storage devices 122. The one or more servers 121 may include any suitable computer hardware and software configured to provide the features disclosed herein. The storage devices 122 may include any tangible computer-readable storage media including, for example, read-only memory (ROM), random-access memory (RAM), magnetic disc storage media, optical storage media, solid state (e.g., flash) memory, etc.

The client devices 130 may include any number of computing devices that enable an end user to access the features disclosed herein. For example, the client devices 130 may include, for example, desktop computers 131, tablet computers 132, mobile phone 133, notebook computers 134, etc.

The third-party communications devices 140 may include email servers such as a GOOGLE® email server (GOOGLE is a registered service mark of Google Inc.), third-party instant message servers, third-party social network servers such as a FACEBOOK® or TWITTER® server (FACEBOOK is a registered trademark of Facebook, Inc. TWITTER is a registered service mark of Twitter, Inc.), cellular service provider servers that enable the sending and receiving of messages such as email messages, short message service (SMS) text messages, multimedia message service (MMS) messages, or any other device that enables individuals to communicate using any protocol and/or format.

The third-party service devices 150 may include any number of computing devices that enable an end user to request one or more services via network communication. The smart devices 160 may include any number of hardware devices that communicate via any of the computer networks 110 and are capable of being controlled via network communication. The third-party 'API-enabled' services 170 may include any number of services that communicate via any of the computer networks 110 and are capable of being controlled via an Application Programming Interface (API), such as a ride-sharing service. The third-party 'Web-enabled' services 180 may include any number of services that may have no direct third-party interface, other than informational content, e.g., information hosted on a third-party web site or the like, such as a train schedule.

As is described in more detail in commonly-assigned U.S. patent application Ser. No. 14/986,157 ("the '157 application"), the Universal Interaction Platform (UIP) allows users to interact with individuals, service providers, and smart devices 160 by sending a message (in the form of a message object) from a client device 130. The message object is output by the client device 130 for transmittal to the server 121. When the user is interacting with a service provider, the UIP may format an instruction for the third-party service device 150 associated with the service provider and output the instruction from the server 121 for transmittal to the third-party service device 150. Similarly, when the user is interacting with a smart device 160, the UIP may format an instruction for the smart device 160 and output the instruction from the server 121 for transmittal to the smart device 160. The server 121 may also receive a response from the third-party service device 150 or smart device 160, format a response message (e.g., in the form of a response message object) for the user, and output the response message object for transmittal to the client device 130.

Figure 2A:
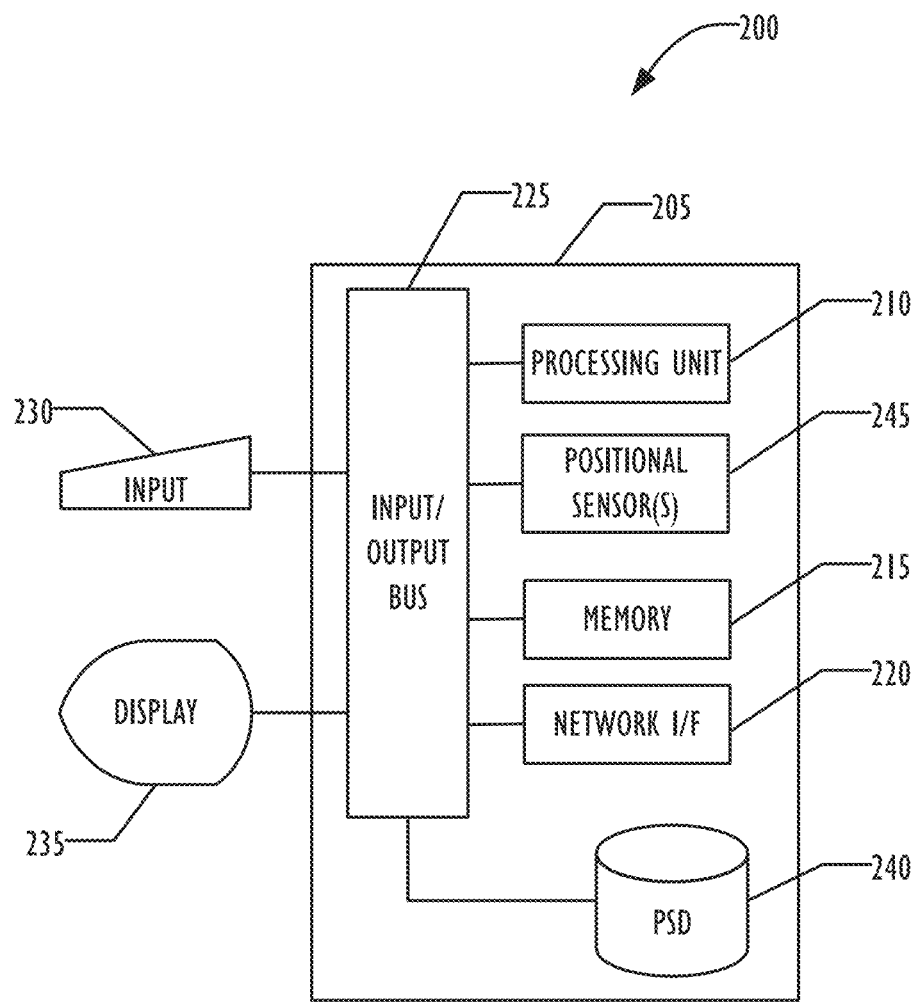
FIG. 2A is a block diagram illustrating a computer which could be used to execute the various processes described herein, according to one or more of disclosed embodiments.

Referring now to FIG. 2A, an example processing device 200 for use in the communication systems described herein according to one embodiment is illustrated in block diagram form. Processing device 200 may serve in, e.g., a server 121 or a client device 130. Example processing device 200 comprises a system unit 205 which may be optionally connected to an input device 230 (e.g., keyboard, mouse, touch screen, etc.) and display 235. A program storage device (PSD) 240 (sometimes referred to as a hard disk, flash memory, or non-transitory computer readable medium) is included with the system unit 205. Also included with system unit 205 may be a network interface 220 for communication via a network (either cellular or computer) with other mobile and/or embedded devices (not shown). Network interface 220 may be included within system unit 205 or be external to system unit 205. In either case, system unit 205 will be communicatively coupled to network interface 220. Program storage device 240 represents any form of non-volatile storage including, but not limited to, all forms of optical and magnetic memory, including solid-state storage elements, including removable media, and may be included within system unit 205 or be external to system unit 205. Program storage device 240 may be used for storage of software to control system unit 205, data for use by the processing device 200, or both.

System unit 205 may be programmed to perform methods in accordance with this disclosure. System unit 205 comprises one or more processing units, input-output (I/O) bus 225 and memory 215. Access to memory 215 can be accomplished using the communication bus 225. Processing unit 210 may include any programmable controller device including, for example, a mainframe processor, a mobile phone processor, or, as examples, one or more members of the INTEL® ATOM™, INTEL® XEON™, and INTEL® CORE™ processor families from Intel Corporation and the Cortex and ARM processor families from ARM. (INTEL, INTEL ATOM, XEON, and CORE are trademarks of the Intel Corporation. CORTEX is a registered trademark of the ARM Limited Corporation. ARM is a registered trademark of the ARM Limited Company). Memory 215 may include one or more memory modules and comprise random access memory (RAM), read only memory (ROM), programmable read only memory (PROM), programmable read-write memory, and solid-state memory. As also shown in FIG. 2A, system unit 205 may also include one or more positional sensors 245, which may comprise an accelerometer, gyrometer, global positioning system (GPS) device, or the like, and which may be used to track the movement of user client devices.

Figure 2B:
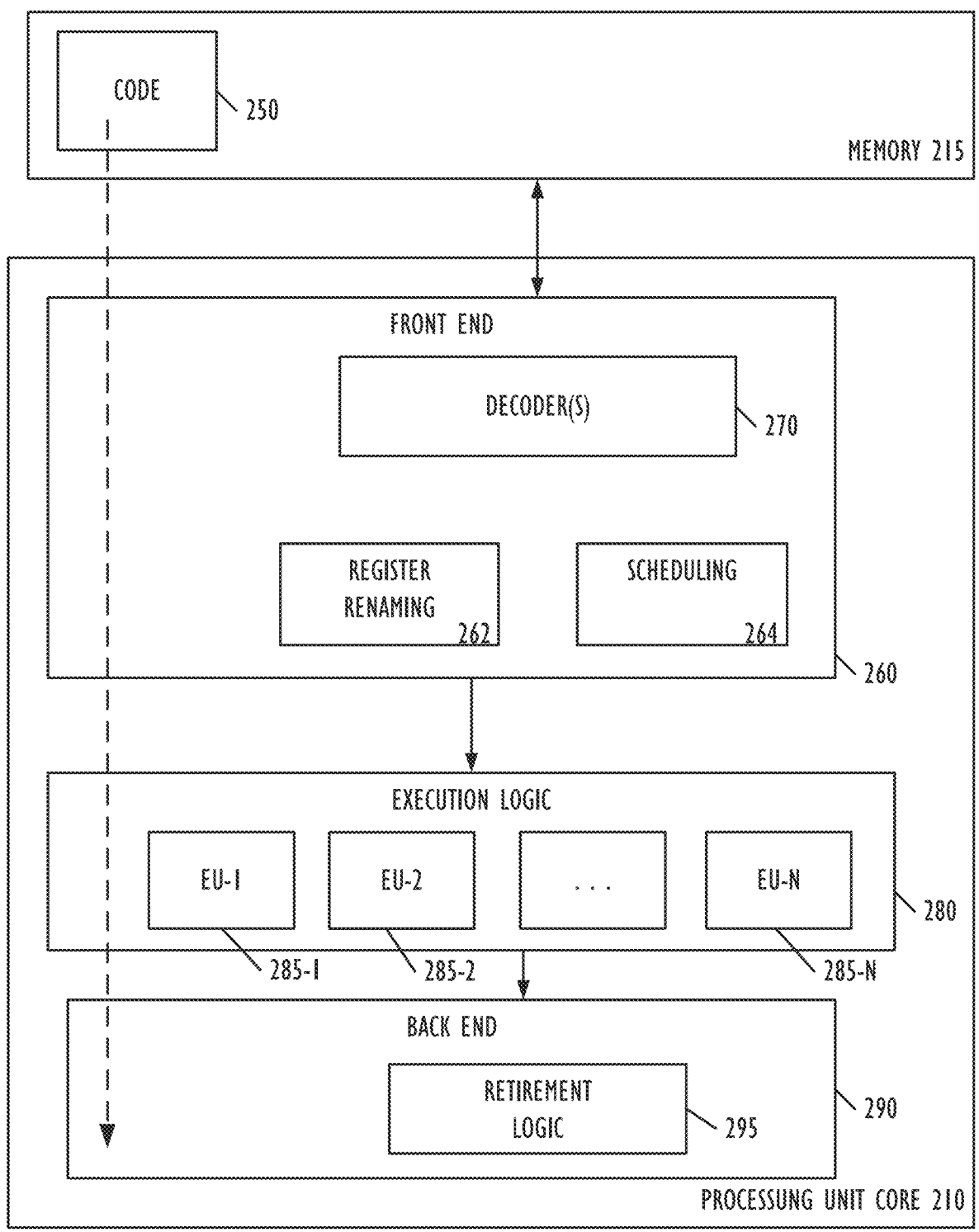
FIG. 2B is a block diagram illustrating a processor core, which may reside on a computer, according to one or more of disclosed embodiments.

Referring now to FIG. 2B, a processing unit core 210 is illustrated in further detail, according to one embodiment. Processing unit core 210 may be the core for any type of processor, such as a micro-processor, an embedded processor, a digital signal processor (DSP), a network processor, or other device to execute code. Although only one processing unit core 210 is illustrated in FIG. 2B, a processing element may alternatively include more than one of the processing unit core 210 illustrated in FIG. 2B. Processing unit core 210 may be a single-threaded core or, for at least one embodiment, the processing unit core 210 may be multithreaded, in that, it may include more than one hardware thread context (or "logical processor") per core.

FIG. 2B also illustrates a memory 215 coupled to the processing unit core 210. The memory 215 may be any of a wide variety of memories (including various layers of memory hierarchy), as are known or otherwise available to those of skill in the art. The memory 215 may include one or more code instruction(s) 250 to be executed by the processing unit core 210. The processing unit core 210 follows a program sequence of instructions indicated by the code 250. Each instruction enters a front end portion 260 and is processed by one or more decoders 270. The decoder may generate as its output a micro operation such as a fixed width micro operation in a predefined format, or may generate other instructions, microinstructions, or control signals which reflect the original code instruction. The front end 260 may also include register renaming logic 262 and scheduling logic 264, which generally allocate resources and queue the operation corresponding to the convert instruction for execution.

The processing unit core 210 is shown including execution logic 280 having a set of execution units 285-1 through 285-N. Some embodiments may include a number of execution units dedicated to specific functions or sets of functions. Other embodiments may include only one execution unit or one execution unit that can perform a particular function. The execution logic 280 performs the operations specified by code instructions.

After completion of execution of the operations specified by the code instructions, back end logic 290 retires the instructions of the code 250. In one embodiment, the processing unit core 210 allows out of order execution but requires in order retirement of instructions. Retirement logic 295 may take a variety of forms as known to those of skill in the art (e.g., re-order buffers or the like). In this manner, the processing unit core 210 is transformed during execution of the code 250, at least in terms of the output generated by the decoder, the hardware registers and tables utilized by the register renaming logic 262, and any registers (not shown) modified by the execution logic 280.

Although not illustrated in FIG. 2B, a processing element may include other elements on chip with the processing unit core 210. For example, a processing element may include memory control logic along with the processing unit core 210. The processing element may include I/O control logic and/or may include I/O control logic integrated with memory control logic. The processing element may also include one or more caches.

Exemplary Electronic Device User Interface

Figure 3:
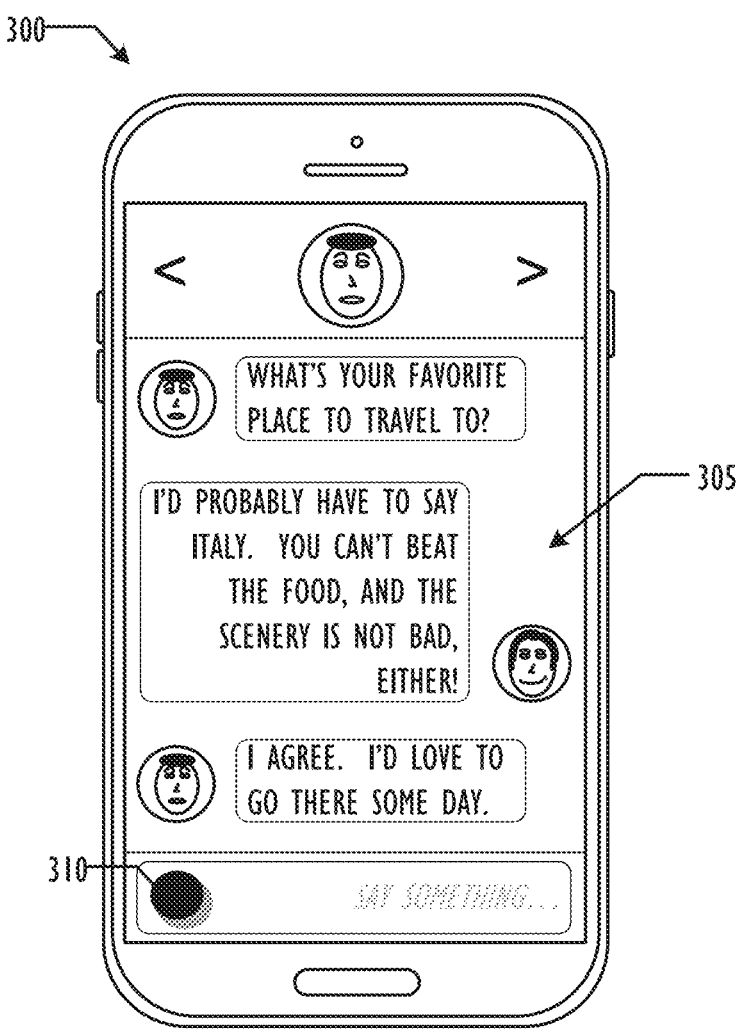
FIG. 3 shows an example of an electronic device executing an IPA-enabled system, according to one or more disclosed embodiments.

FIG. 3 shows an example of an electronic device 300 executing an IPA-enabled system, according to one or more disclosed embodiments. The user interface 305 shown in FIG. 3 may, e.g., be displayed on the display of a mobile phone, laptop computer, wearable, or other computing device. The user interface 305 may have a different layout and configuration based on the type of application the user is executing (e.g., a messaging application is illustrated in FIG. 3), the type of device, and/or the size of display screen that the user interface is being viewed on. In certain embodiments, elements of user interface 305 may be interacted with by a user utilizing a touchscreen interface or any other suitable input interface, such as a mouse, keyboard, physical gestures, verbal commands, or the like. It is noted that the layout and content of user interface 300 has been selected merely for illustrative and explanatory purposes, and in no way reflects limitations upon or requirements of the claimed inventions, beyond what is recited in the claims.

Also shown in the user interface 305 is an IPA activation button 310. This IPA activation button 310 may have the capability to launch an IPA software agent. In some embodiments, the activating the IPA may comprise displaying a text box into which a user may enter textual commands or queries to be processed and acted upon by the IPA. Alternatively, or in addition, activating the IPA may cause a microphone of the user's device to begin listening for the user's verbal commands or queries. In still other embodiments, the system's IPA may always be 'listening' for user commands or queries (e.g., in response to the user reciting a unique IPA activation phrase), and thus not need to be specifically activated, e.g., via clicking on IPA activation button 310. As will be described herein, the IPA activated, e.g., via button 310, may benefit from the improved NLP IDS systems described herein.

Parsing an Exemplary User Command using a Search-Based Query

Figure 4A:
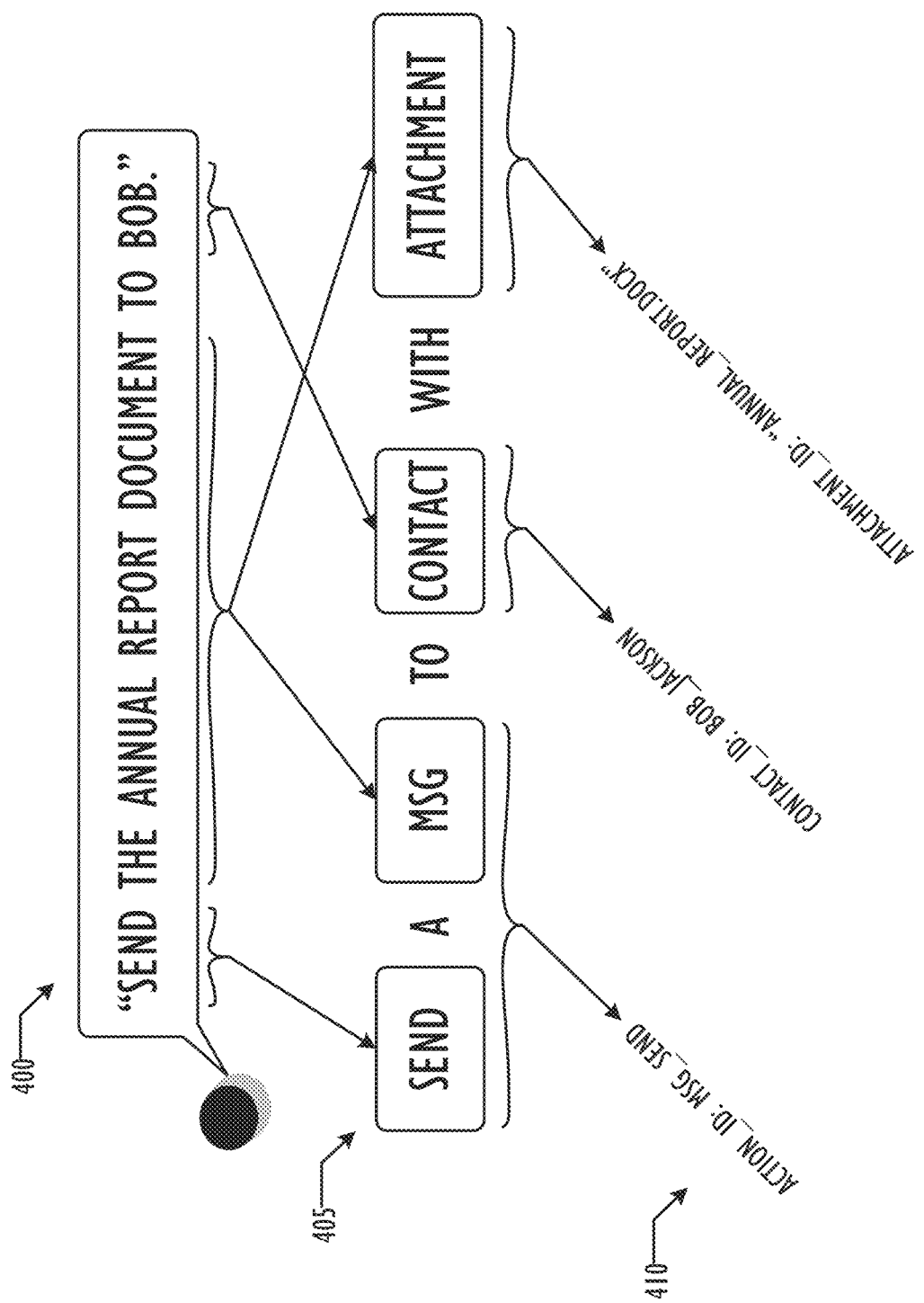
FIG. 4A is a diagram illustrating the parsing of a user command, according to one or more disclosed embodiments.

Referring now to FIG. 4A, a diagram illustrating the parsing of an exemplary user command 400 is shown, according to one or more disclosed embodiments. As mentioned above, user commands and queries may come into a system in the form of natural language input, e.g., via the use of an IPA. In the example of FIG. 4A, the exemplary user command 400 is, "Send the Annual Report Document to Bob." When attempting to understand the meaning of natural language input, NLP systems traditionally first attempt to parse the command, i.e., in order to better understand its meaning and take an appropriate responsive action. Parsing may comprise, e.g., analyzing the command in terms of its grammatical constituents, identifying the parts of speech, syntactic relations, etc., between the words in the command. By determining the parts of speech, meanings, and relationships of the various constituent parts of the command, an NLP system may build up a grammar for the user command. However, even once the grammar is known, the NLP system still has to determine what to do with the command, such as: run a query, search for a document, make a call to an API, send a message to a particular contact, etc.

Returning to the exemplary user command 400 of FIG. 4A, exemplary parse 405 shows that the verb "send" was identified as a potential action for the system to execute. Based on the grammar of the sentence, the phrase "the Annual Report document" was determined to be the object of the action "send." Based on natural language processing rules, the phrase "the Annual Report document" was determined to refer to a message. Thus, the parse of command 400 has determined that the user command is likely requesting to send a message of some sort. Further, the natural language processing of the phrase "the Annual Report document" indicated that there was some sort of document or file attachment that needs to be included with the message that the user is requesting to be sent. Finally, natural language processing of the proper noun "Bob" (along with, perhaps, Bob's placement after the word "to") indicated that Bob is a likely contact of the user sending the command, and Bob is who the message should be directed to. Thus, the initial command, "Send the Annual Report Document to Bob." 400 has been parsed 405 to a meaning of effectively, "{Send [type:Message]} to {Contact} with {Attachment}." As may be understood, many different utterances from the user may have resulted in being parsed into the same grammar as parse 405. For example, "Send that picture to Steven," "Make sure Bob Johnson receives the file," and "Get Michael that cat video right away," may each have parsed to the fundamental meaning of: "{Send [type:Message]} to {Contact} with {Attachment}."

Once the system has parsed the command and understands its fundamental meaning, the various actions, entities, and attributes in the command (e.g., the other nouns, adjectives, etc., in the command) have to be linked to real world systems, services, actions, documents, files, persons, etc. that the system knows about and knows how to deal with. In the example of FIG. 4A, the various IDs 410 represent the exemplary system ID equivalents for the exemplary parse 405. For example, based on the overall context of the command, the {Send a Message} part of the command may be determine to be an action that the user wants the system to run and, in particular, the action with system Action_ID: "MSG_SEND." The action "MSG_SEND" in the system may, for example, open up the system's native messaging application, and even generate a new email message object, text message object, etc., for the message that is to be sent. It is to be understood that, in other commands, the same verb, "send," may be determined to relate to an entirely different user intent. For example, in the command, "Send me a reminder at nine o'clock," the command may be parsed to determine that the user's desired action is to create a reminder on their calendar, and thus link to the action with system Action_ID: "MAKE_REMINDER."

Likewise, the other parts of the command 400's grammar need to be linked to their system ID equivalents before the system can take action on the command. In this case, it is known that the contact that is to be the recipient of the message is a "Bob." In this example, perhaps the person named Bob that the user most frequently communicates with (or has most recently communicated with) is Bob Jackson, a contact of the user with Contact_ID: "Bob_Jackson." In cases where the system cannot resolve a contact (or other system entity), or cannot resolve a single system entity with sufficient relevance, the IPA system may ask a user for clarification, for example, "Did you mean your contact Bob Jackson or your contact Bob Smith?"

Finally, in this example, it is known that the message is to be sent with a document attachment that has been described by the user as "the Annual Report." As with the example of resolving the contact Bob Jackson above, the system may perhaps default to attaching the most frequently modified or opened document with a filename or title metadata similar to "the Annual Report," which, in this case may be a document with Document_ID: "Annual_Report.docx." In cases where the system cannot resolve a document, or cannot resolve a single document with sufficient relevance, the IPA system may ask a user for clarification, for example, "Did you mean 'Annual_Report_2016.docx' or 'Annual_Report_2017.docx'?"

As may now be understood, in traditional NLP intent determination systems, accurately determining the user's intent is key to handling the user command correctly. For example, if the NLP intent determination system doesn't determine the action correctly (i.e., to "Send" something in example 400 above), the user will not get the expected response from the system. For example, the system may try to "Search" for a document named "Annual Report" instead, or do something else. Even if the user's intent is interpreted correctly, the various other attributes and entities in the user command must be linked to those intents and used by those intents in the correct way, otherwise, again, the user will not get the expected response from the system.

Thus, according to some embodiments described herein, rather than using complex and computationally-expensive parsing algorithms to perform NLP intent determination (as is typically currently done in the art), the problem of intent determination may be reduced to a 'search-based' problem. For example, consider a typical plaintext search. A user simply types (or speaks) a sentence, phrase, or other utterance that they are interested in searching, it is converted to text (if necessary), and, if that text exists in the searched database, the search will return results, e.g., listing the location of the text string that was searched for, the number of occurrences of the text string, etc. If so-called "fuzzy searching" is used, then inexact matches to the input text string may also be returned and even ranked by relevance, e.g., based on language models, artificial intelligence, or other string-matching techniques.

Some search engines use the concept of "documents" to store their information. A "document" in this context can refer to any container of text or other bits of information. A single real-world document, e.g., an Annual Report PDF, could actually be broken down into many separate and individual containers in a search database, if so desired. Documents in a search database can possess various kinds of metadata information, which can include (but is not limited to) "Linked_IDs." For example, an article, a link to the article, and a transcription of the article can all be stored separately as documents in the database, but each may be linked to the same document ID. Other metadata information may include data modified, date created, geo-location, name of creator, etc. The database index may or may not use all of the metadata information associated with a given document, but each item that the system wants to be individually searchable may be stored as a separate document.

For example, a search on a document store for the term "Pizza" may pull back many different kinds of search results, e.g., a document with the file name "Pizza.pdf," a URL link to a file named "pizza_recipes.html," and a URL link to an article entitled, "Best Pizza." Typical plaintext fuzzy searching rules state that, the closer the match between the text and the search string, e.g., the more words in common, the more similar the string of characters in the search string are, etc., the higher the relevancy score for the search result should be.

Using the example above, every object in the document store that may be searched upon may also have an arbitrary amount of metadata embedded in it. This metadata data can be used for any number of reasons, e.g., to point to a particular location in memory or on the Internet, to specify the date/time or location where the file was uploaded, to specify that a document is part of a search result, etc.

According to some embodiments described herein, the document's metadata may also be used to store reference(s) to system functionality associated with the text string stored in the document. For example, if the document happens to store the expression, "Order a Pizza from Dave's," then the "Action_ID" for the OrderPizza command from Dave's Pizza's API may be stored in the metadata of the document, e.g., in the form of a tag, thereby indicating that the particular expression, "Order a Pizza from Dave's," is associated with a particular action that the system know how to perform (or have performed by a third party service).

Expanding upon this metadata tagging concept, according to some embodiments, any time that a new command or "intent" is added to the system, e.g., "Send {item}," or "Search {item}," etc., the system may generate a desired number of Natural Language (NL) sentence variants that effectively mean "Send {item}," or "Search {item}," respectively. In some embodiments, the NL variants for a given command or "intent" may be machine generated, e.g., using a language model. Thereby, the system may be able to generate hundreds—or even thousands—of NL variants with the same (or similar) meaning to the newly-added system command or intent in a very short amount of time, and with relatively minimal computational expense, especially as compared to the computational overhead generally associated with traditional natural language parsing techniques. In other embodiments, the system may generate NL variants of system commands in the background to gradually grow the depth and value of the document store over time. Moreover, variants for multiple commands may be generated simultaneously in parallel to further enhance the efficiency of the variant generation process.

Each of the generated command variants may then be saved in the aforementioned document store, tagged with an appropriate Action_ID, and then indexed so that they may be quickly searched. In addition to, or in place of an Action_ID, the generated command variants may be tagged with a Parse_ID, which may be used to point the system to a particular grammar that knows how to interpret the various words in the particular command variant. (However, even with knowledge of the correct grammar to use, the system will still may have to figure out what is the proper system action to take.) In some embodiments, the command variants may be generated at a system-wide level, whereas, for other embodiments, command variants may be generated in a customized fashion on a personalized, i.e., per-user, basis.

Figure 4B:
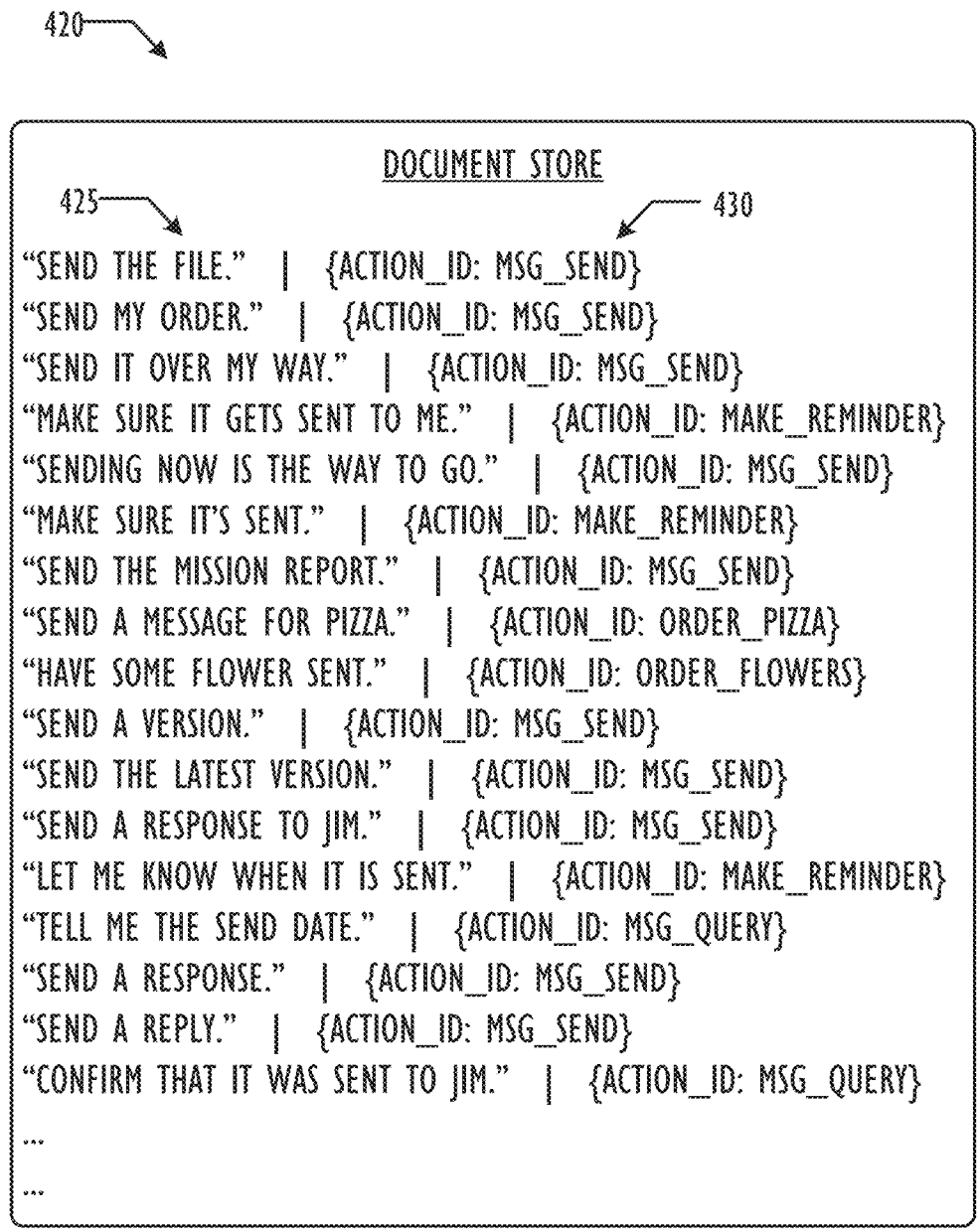
FIG. 4B illustrates an exemplary document store for natural language-generated exemplary user command variants, according to one or more disclosed embodiments.

Referring now to FIG. 4B, an exemplary document store 420 for natural language-generated exemplary user command variants is shown, according to one or more disclosed embodiments. In the example shown in FIG. 4B, the newly-added system command was "Send {item}," wherein {item} refers to the thing that the user intends to send somewhere in response to the "Send" command. As discussed above, a desired number of command variants 425 may be generated by the system and tagged with an appropriate Action_ID 430 for the particular generated command variant. As shown in FIG. 4B, the generated command variants may be tagged with different Action_IDs, even though they were initially generated based upon the same seed command (i.e., "Send {item}"). For example, some of the generated variants may be associated with the "MSG_SEND" Action_ID for sending communication messages, whereas other generated variants may be associated with the "ORDER_PIZZA" Action_ID, which may be for sending pizzas to a customer address using a particular third party pizza vendor's API.

Once the document store 420 has been fully created (or populated to a desired level) and indexed for search, increased efficiencies may be gained in the process of determining the intent of a user's natural language command or query. In particular, rather than being parsed up front, an incoming user command or query may be searched against the document store 420. If the document that is the top search hit (i.e., the most relevant search results) for the user command is tagged in its metadata with an Action_ID (as opposed to a File_ID or some other kind of system ID), then the system may determine that the user is asking it to perform a particular action or function, i.e., the function that is associated with the Action_ID in the metadata of the top search hit. In this manner, the system may be said to be 'search-based,' rather than 'parse-based,' i.e., because it is using a search index, and not a parsing tree, to find out that the user command query is, in fact, actually a command to the system to perform an action or function (and not a reference to a file or document or other system asset).

As mentioned above, the notion of fuzzy searching may be used when searching the user command against the document store. The goal of fuzzy searching is to score each imperfect search result for relevance, such that the most likely match to the search query is returned as the most relevant search result. Returning to the example of FIG. 4A, the exemplary user command 400, "Send the Annual Report Document to Bob," may not match exactly to any of the hundreds (or thousands) of generated documents in the document store 420, but it may match with fairly high relevance to the particular generated document 425 storing the sentence of: "Send a response to Jim," which may already have been linked to the correct Action_ID in the system of "MSG_SEND." There may also be less relevant generated documents, e.g., "Let me know when it is sent." Some generated documents may actually link to a different ActionID than the most relevant result. For example, one "send"-based Action_ID (e.g, "MSG_SEND") may go to a message service, and one may go to Dave's Pizza (e.g., "ORDER_PIZZA"). In other words, the same command trigger word "Send" could result in different system functionality, so each trigger word has to be considered in the context of the full user command. The more complex a system is, and the more capabilities it has, the more complex the Action_ID mapping for the system is going to be.

In some embodiments, the generated command variants may be stored in the same document store in which the system has already stored and indexed each document, file, message, and other asset associated with the user. Obviously, not all of these other assets may necessarily be tagged with Action_IDs or Parse_IDs in their metadata. However, in some cases, e.g., a text message that a user sent a week ago with the words, "Send Bob the document" in it may be a closer textual match to an incoming user command of "Send the Annual Report Document to Bob." A document in the document store relating to a previously sent message would not necessarily be associated with a system Action_ID because it is simply a record of a sent message—and not a command to the system to do some action at the present time. In such a case, then, the previous text message the user had sent including the words, "Send Bob the document" may turn out to be the most relevant search result to the user's query, indicating that the user is not asking the system to perform an action at this time, but is, in fact, asking a question about the previously-sent text message or attempting to read or retrieve the previously-sent text message. In other embodiments, the system may utilize separate document stores, e.g., one to store the user's documents, files, messages, and other assets, and one to store the generated command variants. In such embodiments, the search could be enabled by using two separate search indexes working in parallel (i.e., one over the user's assets, and one over the generated command variants), with both doing the search at the same time and combining the search results after for a post-processing step.

Figure 4C:
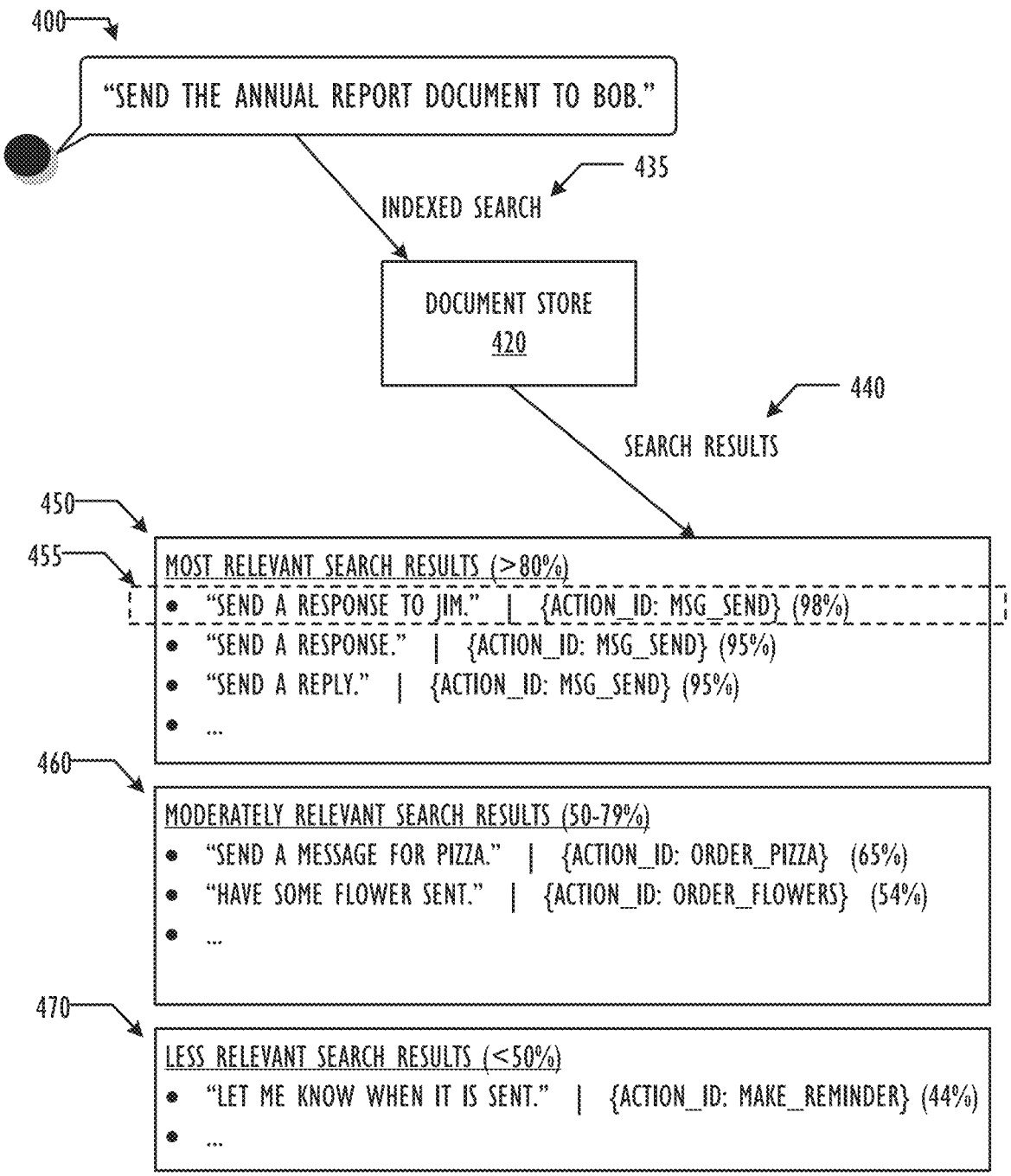
FIG. 4C is a block diagram illustrating an indexed search of an exemplary user command against a document store of natural language-generated exemplary user command variants, according to one or more disclosed embodiments.

Referring now to FIG. 4C, a block diagram illustrating an indexed search 435 of an exemplary user command 400 against a document store 420 of natural language-generated exemplary user command variants is shown, according to one or more disclosed embodiments. In the example of FIG. 4C, the search results 440 are broken down into three categories (though this is merely exemplary): Most Relevant Search Results (450), having a search relevancy score of greater than 80%; Moderately Relevant Search Results (460), having a search relevancy score of greater than 50% and less than 79%; and Less Relevant Search Results (470), having a search relevancy score of less than 50%. In the example of FIG. 4C, the search result 455 ("Send a Response to Jim.") may be identified as the most relevant search hit result to the search command 400 of "Send the Annual Report Document to Bob." In some embodiments, if there is more than one search results with greater than a threshold level of relevance (e.g., a 97% relevance score), the IPA may generate a prompt asking the user to resolve which of the actions associated with the two or more highly-relevant search results is more aligned with the user's current desired intent. For example, the IPA may prompt the user as follows: "Did you mean to 1.) Send a document named "Annual Report" to Bob; or 2.) Send a message to Bob having the text, 'the Annual Report Document'?" Once the user resolves his or her intent, the system may take the appropriate action or sequence of actions.

As described above, the most relevant search result 455 may already have been tagged in its metadata that it is associated with a particular Action_ID, such as "MSG_SEND." Thus, at this point, the IPA system could adjudge that the user is asking the system to perform a function, namely, the sending of a message, rather than searching for or opening a file or document called "Annual Report." Further, the search result 455 may also contain a pointer to a particular grammar for the system to use to parse the generated command (in this case, the sentence: "Send a Response to Jim."). Due to the textual similarity between the search query and the most relevant search result 455, this is likely to be a grammar that may also be used to parse the search query. By giving the system a command that it already knows how to parse up front (e.g., via one of the generated commands), computational efficiencies may be gained as compared to systems wherein the system has to figure out how to parse an incoming user command or query from scratch.

In cases where no generated document in the document store matches the incoming command query at greater than a threshold relevancy level, the system may simply default to the method of spending the computational resources to attempt to parse the command up front. However, if there is no significant match with the document store, it is likely that the system will not even know how to handle the incoming command.

NLP Intent Determination Service (IDS) System

Figure 5:
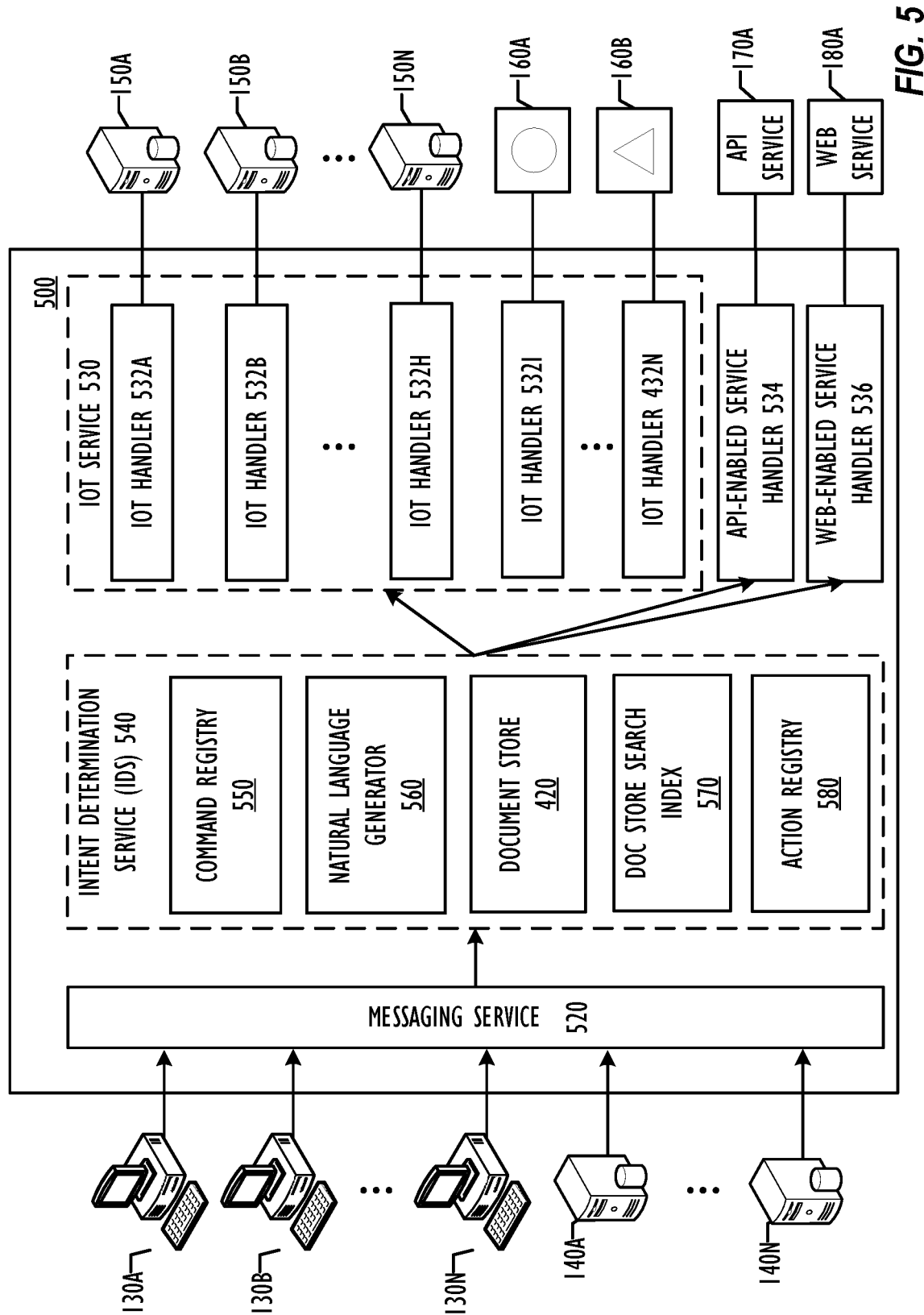
FIG. 5 is a block diagram of an NLP Intent Determination Service (IDS), according to one or more disclosed embodiments.

Referring now to FIG. 5, one embodiment of a Universal Interaction Platform (UIP) 500 including a search-based NLP Intent Determination Service (IDS) system is illustrated in further detail, according to one or more disclosed embodiments. The UIP 500 includes a messaging service 520, an IoT (Internet of Things) service 530, and an Intent Determination Service (IDS) 540. The IoT service 530 may include a number of individual IoT handlers 532. In this disclosure, an IoT handler may, e.g., be implemented as a software program or sub-program within the centralized communication system that directly interfaces with an autonomous, connected device that is, e.g., capable of specialized data collection, processing, and/or action. Examples of connected devices include, e.g., smart thermostats, smart televisions, IP-enabled cameras, home automation hubs, etc. The messaging service 520, the IoT service 530, the IoT handlers 532, and the IDS 540 may be implemented as software modules stored on the storage device 122 and executed by the server 121.

The messaging service 520 sends and receives messages to and from the client devices 130 (e.g., as composed via user interfaces, such as exemplary user interface 305, described above). The messaging service 520 also communicates with the third-party communications devices 140 as described, for example, in the various commonly-assigned patent applications, which are referenced above and incorporated by reference.

The IoT service 530 includes an IoT handler 532 for each service provider or smart device 160 supported by the platform 500. Each IoT handler 532 may interact with a particular service provider or type (e.g., brand, model, etc.) of smart device 160. For example, IoT handler 532a may interact with a smart television, while IoT handler 532i may interact with a different type of device, such as a smart thermostat.

The API-Enabled Service Handler 534 may, e.g., be implemented as a software program or sub-program within the centralized communication system that directly interfaces with a third-party service (170a) that is made accessible using available APIs to perform specific functions that the corresponding service is able to perform, such as ordering a car from a ride sharing service. According to some embodiments, API-Enabled Service Handler 534 may be adapted using the various processes set forth in the '157 application.

The Web-Enabled Service Handler 536 may, e.g., be implemented as a software program or sub-program within the centralized communication system that directly interfaces with a third-party product or service (180a) that is only made available via generic web connectivity, typically in the form of informational data, such as a website, online database, etc. According to some embodiments, Web-Enabled Service Handler 536 may be adapted using the various processes set forth in the '157 application.

In some instances, the UIP 500 may receive an indication from the user of precisely which service provider, smart device, etc. a given command or query should be sent to. For example, if a user is in an email application and says or types the command "Send Email" (or clicks on a "Send Email" button), then the currently active email message should be sent by the system using the system's native emailing functionality. In such instances, the IDS 540 may not need to be engaged by the UIP 500. By contrast, in some instances, the UIP 500 may receive a 'generic' command or query from the user of the device via the IPA, i.e., a command or query that is not specifically directed to a particular smart device 160 or service provider device 150. For example, "Send the Annual Report document to Bob." may be a command that could theoretically be handled by various service endpoints known to the system. In instances of 'generic' commands or queries being received by the UIP 400, the IDS 540 may be engaged in order to attempt to determine the true intent of the user's command or query. The IDS 540 may be comprised of various components that are ultimately used to intercept and interpret 'generic' commands or queries from the user of the device using an indexed search-based process rather than a Natural Language parsing-based process.

As described above, the IDS 540 may comprise several components. First, a Command Registry 550 may be used to store a list of every command that the system is capable of handling. Examples of common commands may include action verbs, such as: "Search," "Order," "Send," "Compose," etc. The Command Registry 550 may feed into a Natural Language Generator 560. The Natural Language Generator 560 may then be used to generate, for each command in the Command Registry 550, a desired number of variants of sentences or commands that relate to the given command. As mentioned above, a neural network or other machine learning application may be used to automatically generate further command variants. In some embodiments, the Natural Language Generator 560 may be working in the background, i.e., even when the system is idle or not currently processing a user command, to generate more and more command variants.

The output of the Natural Language Generator 560 may then be feed into the aforementioned document store 420. As mentioned above, each generated sentence or command variant may be stored as an individual document in the document store, and may be tagged with any relevant metadata information, including an associated Action_ID or Parse_ID. A document store search index 570 may then be created to allow for rapid searching of incoming user commands against the document store 420. Finally, each of the Action_IDs known to the system may be stored in an Action Registry 580. Action Registry 580 may serve as a simple lookup table that links given Action_IDs to the particular native or third-party API calls that the system needs to make (and, perhaps, the sequence thereof) in order to execute the particular system action. Once the IDS 540 has determined what action the system needs to take (if it needs to take any action) in response to the current user command or query, the IDS 540 may interface with the IOT Service 530, or the appropriate Service Handler 534/536 to effect the user's desired action, e.g., by making an appropriate API call and sending the appropriate parameters to the appropriate service endpoint. Alternately, if the user's desired action may be handled natively by the system without interfacing with a third-party endpoint, the IDS 540 may simply initiate the appropriate API call (or series of API calls) to effect the user's desired system action(s).

Figure 6A:
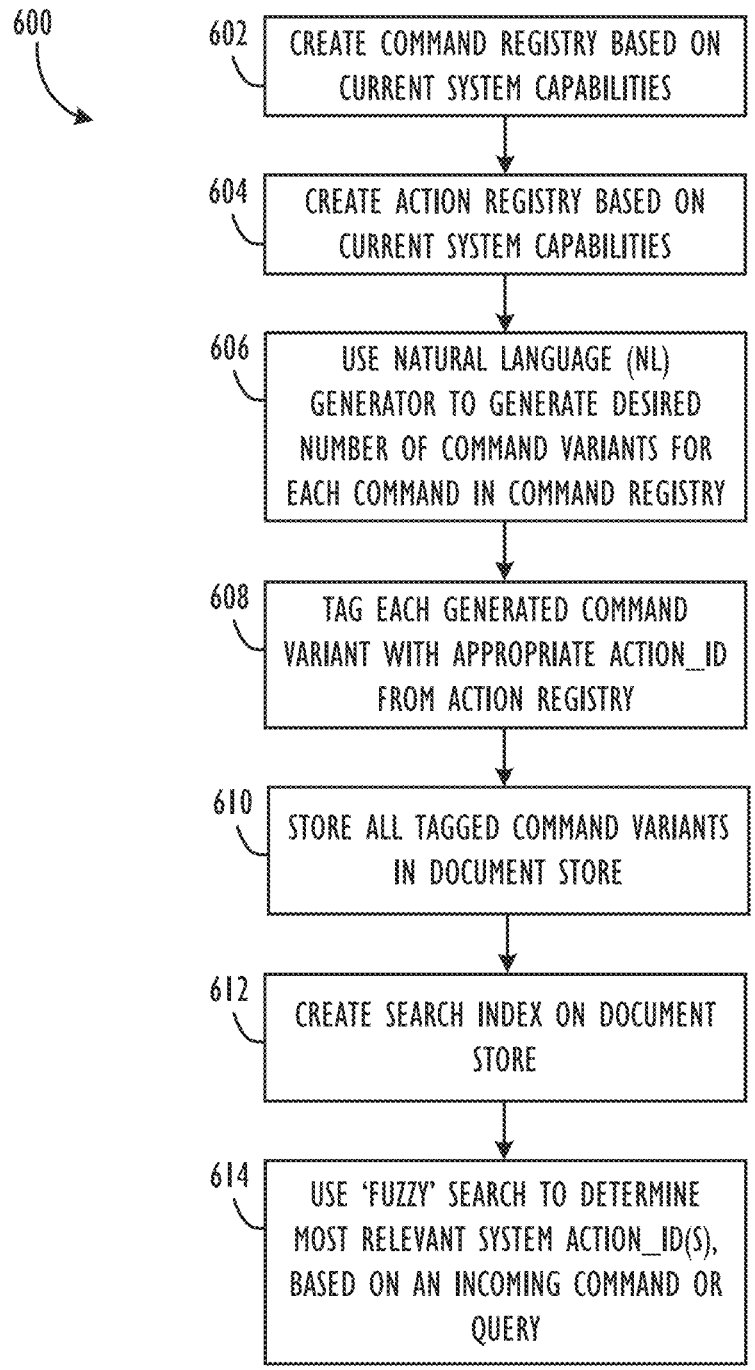
FIG. 6A shows a flowchart for a method for establishing an NLP Intent Determination Service, according to one or more disclosed embodiments.

FIG. 6A shows a flowchart 600 of a method for establishing an NLP Intent Determination Service, according to one or more disclosed embodiments. First, at Step 602, the method 600 may create a command registry based on the current system capabilities. As described above, the Command Registry 550 may comprise a listing of all commands the system is currently capable of responding to. Next, the method 600 may establish an Action Registry 604 based on the current system capabilities. The Action Registry 580 may comprise a listing of all actions the system is currently capable of "doing." As described above, the action registry may be far larger than the command registry as, there may be, for example, more than 20 different API actions in the system related to the command: "Send." Each unique Action_ID stored in the Action Registry, then, may pertain to a particular send method or send protocol that is implemented by a particular native or third-party service accessible to the system.

Next, at Step 606, the method 600 may use a generator, e.g., a Natural Language (NL) generator, to generate a desired number of command variants for each command stored in the Command Registry 550. Next, at Step 608, the method 600 may tag each command variant with the desired metadata, e.g., the corresponding Action_ID from one of the actions stored in Action Registry 580, and all tagged command variants may be stored in a document store 420 (Step 610). Finally, a search index may be created for the document store (Step 612). Once the various components of method 600 have been initialized and established within the system, the system may perform search-based NLP intent determination on incoming user commands, e.g., by performing 'fuzzy' searches of the incoming user command against the indexed document store to determine the most relevant matching documents (and, by extension, the most likely to be relevant system Action_IDs) (Step 614). As described above, in some embodiments, the document store may also contain all of a user's assets (e.g., messages, files, photos, contacts, etc.), in addition to all the system-generated command variants based on the Command Registry 550. In such embodiments, the most relevant matching document in the document store may not be associated with an Action_ID, in which case the IDS may determine that the user is not currently commanding the system to perform an action, but rather may be attempting to view a file, search for a previously sent message, etc.

Figure 6B:
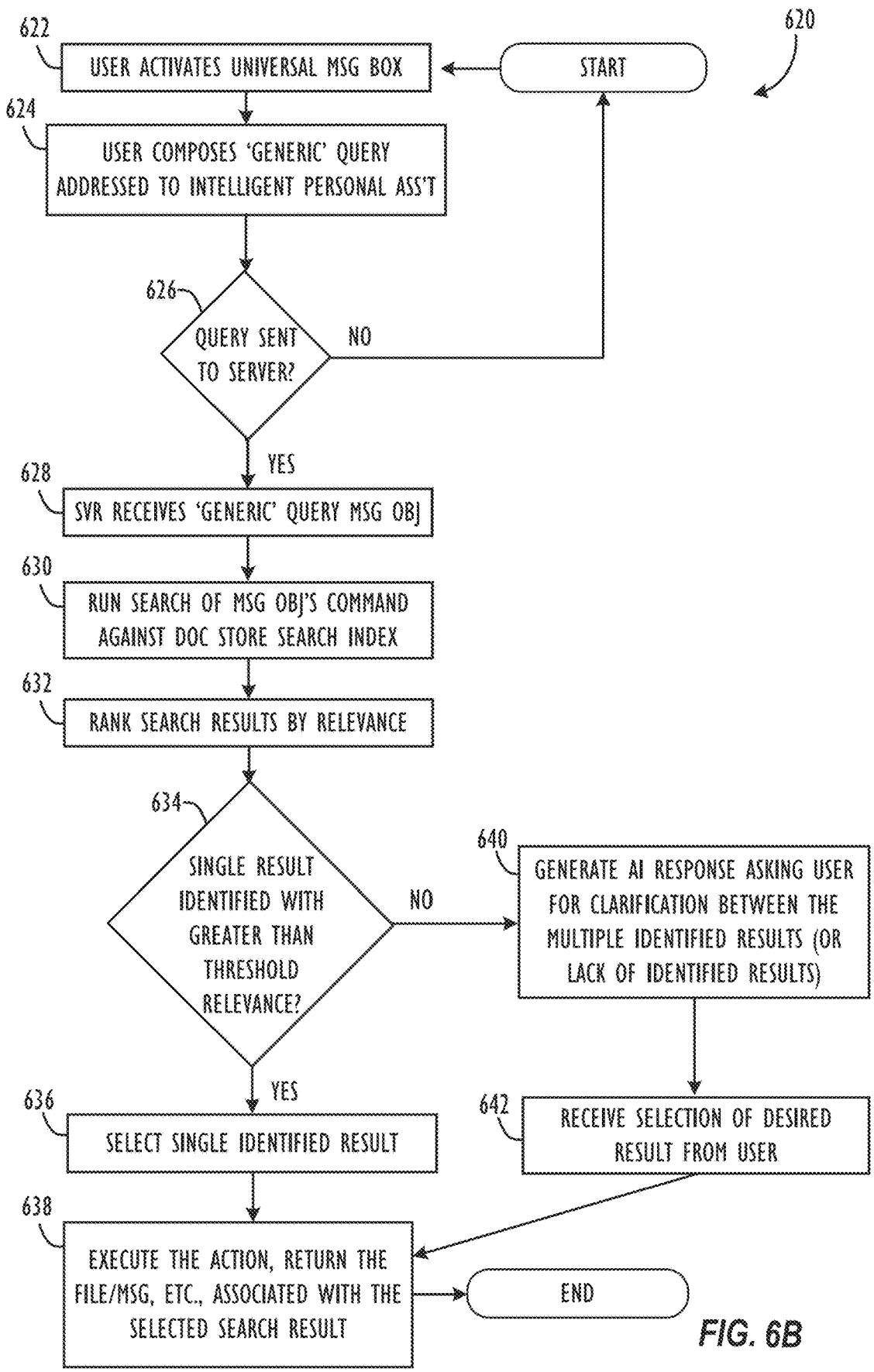
FIG. 6B shows a flowchart for a search-based NLP Intent Determination method for determining the appropriate action for an IPA to take in response to a generic user command, according to one or more disclosed embodiments.

FIG. 6B shows a flowchart 620 for a search-based NLP Intent Determination method for determining the appropriate action for an IPA to take in response to a generic user command, according to one or more disclosed embodiments. First, at Step 622, the method 620 may activate a universal messaging box. The universal messaging box may take the form of a graphical box into which a user may enter textual or verbal commands. In other embodiments, the system's IPA may always be 'listening' for user commands or queries (e.g., in response to the user reciting a unique IPA activation phrase), and thus not need to be messaging box that is specifically activated, e.g., via clicking on a user interface button, such as IPA activation button 310 of FIG. 3. Once the IPA is 'listening' for user input, at Step 624, the user may proceed to compose a 'generic' query addressed to the IPA, i.e., a query that is not specifically directed to a particular service endpoint. If, at Step 626, the query is successfully sent to the system's central communication server (i.e., "YES" at Step 626), the method may proceed to Step 628 for further processing. If, instead, the query is not successfully sent to the system's central communication server for any reason (i.e., "NO" at Step 626), the method may return to Step 622 and allow the user to attempt to resubmit the query.

At Step 628, the central communication server may receive the generic query, e.g., in the form of a universal messaging object or other data structure that the system uses for transmitting information. At Step 630, the method may run a search of the command or query embedded in the messaging object against a previously established document store search index, wherein the document store contains generated command variants that are tagged with associated system Action_IDs and/or Parse_IDs. At Step 632, the search results may be ranked by relevance, e.g., according to the level of similarity between the command or query being searched and the individual document in the document store.

At Step 634, if the result of the searching and ranking processes of Steps 630 and 632, respectively, is that a single search result has been identified with greater than a threshold level of relevance (i.e., "YES" at Step 634), the process may proceed to select the single identified search result (Step 636) and then execute the identified action(s) and/or parse(s) associated with the selected search result (Step 638), assuming there is an identified action or parsing grammar known to the system. Running the identified action using the selected service may comprise, e.g.: calling the a particular third-party service's API with the appropriate parameters as extracted from the generic query message object according to a known parsing grammar; executing the identified action internally (i.e., without making a call to an external service); performing a search; performing a calculation operation; etc. If there is no particular identified action associated with the selected search result, the system may simply find or return the appropriate information requested by the generic query.

If, instead, at Step 634, the result of the searching and ranking processes of Steps 630 and 632, respectively, is that multiple search results (or no search results) have been identified as having greater than a threshold level of relevance (i.e., "NO" at Step 634), the process may proceed to Step 640 and generate an Artificial Intelligence-derived response asking the user for clarification between the multiple identified search results (or the lack of identified search results). For example, with respect to the send message example described above, the system may generate a response at Step 640, such as: "Would you like to send the message using your default email account or your preferred social media account?" Alternatively, if no services are identified, the system may generate a generic response at Step 640, such as: "Which service would you like to use to complete this query?"

At Step 642, the method receives the users selected search result (or service), and then proceeds to Step 638 to execute the identified action(s) action(s) associated with the selected search result, as described above. Once the generic query has been executed, the process of method 600 may end, and the user's device may go back to listening for the next generic query from the user, so that the process may begin again at Step 622 of FIG. 6B.

Examples

The following examples pertain to further embodiments.

Example 1 is a computer-implemented method, comprising: creating a command registry, wherein each item in the command registry represents a command that an Intelligent Personal Assistant (IPA)-enabled system is able to process; creating an action registry, wherein each item in the action registry represents an action that the IPA-enabled system is able to have performed; generating a plurality of command variants for each item in the command registry; storing each of the generated command variants as documents in a document store; tagging at least one of the stored command variants with an identification of at least one action from the action registry; receiving a first command from a user; executing a search of the first command against the documents in the document store; determining a first plurality of search results based on the search of the document store, wherein each search result in the first plurality of search results is associated with a relevance score; selecting at least one search result from the first plurality of search results based, at least in part, on its respective relevance score; obtaining an identification of at least one action that the selected at least one search result has been tagged with; and causing the IPA-enabled system to have the identified at least one action performed.

Example 2 includes the subject matter of example 1, wherein the first command is not explicitly directed to a particular service provider or smart device.

Example 3 includes the subject matter of example 1, further comprising: creating a search index for the document store.

Example 4 includes the subject matter of example 1, wherein the document store further comprises one or more documents, messages, or files of the user.

Example 5 includes the subject matter of example 1, further comprising: tagging at least one of the stored command variants with an identification of at least one parsing grammar known to the IPA-enabled system.

Example 6 includes the subject matter of example 5, wherein the IPA-enabled system is configured to use the at least one known parsing grammar to parse the at least one stored command variant that has been tagged with the identification of at least one parsing grammar.

Example 7 includes the subject matter of example 1, wherein selecting at least one search result from the first plurality of search results based, at least in part, on its respective relevance score further comprises: receiving a selection from the user of a first one of the search results from among two or more search results having greater than a predetermined threshold level of relevancy.

Example 8 includes the subject matter of example 1, wherein the act of generating the plurality of command variants is performed in parallel for two or more of the commands in the command registry.

Example 9 is a non-transitory computer readable storage medium comprising computer executable instructions stored thereon to cause one or more processing units to: create a command registry, wherein each item in the command registry represents a command that an Intelligent Personal Assistant (IPA)-enabled system is able to process; create an action registry, wherein each item in the action registry represents an action that the IPA-enabled system is able to have performed; generate a plurality of command variants for each item in the command registry; store each of the generated command variants as documents in a document store; tag at least one of the stored command variants with an identification of at least one action from the action registry; receive a first command from a user; execute a search of the first command against the documents in the document store; determine a first plurality of search results based on the search of the document store, wherein each search result in the first plurality of search results is associated with a relevance score; select at least one search result from the first plurality of search results based, at least in part, on its respective relevance score; obtain an identification of at least one action that the selected at least one search result has been tagged with; and cause the IPA-enabled system to have the identified at least one action performed.

Example 10 includes the subject matter of example 9, wherein the first command is not explicitly directed to a particular service provider or smart device.

Example 11 includes the subject matter of example 9, further comprising instructions stored thereon to cause the one or more processing units to: create a search index for the document store.

Example 12 includes the subject matter of example 9, wherein the document store further comprises one or more documents, messages, or files of the user.

Example 13 includes the subject matter of example 9, further comprising instructions stored thereon to cause the one or more processing units to: tag at least one of the stored command variants with an identification of at least one parsing grammar known to the IPA-enabled system.

Example 14 includes the subject matter of example 13, wherein the IPA-enabled system is configured to use the at least one known parsing grammar to parse the at least one stored command variant that has been tagged with the identification of at least one parsing grammar.

Example 15 includes the subject matter of example 9, wherein the instructions to select at least one search result from the first plurality of search results based, at least in part, on its respective relevance score further comprise instructions to cause the one or more processing units to: receive a selection from the user of a first one of the search results from among two or more search results having greater than a predetermined threshold level of relevancy.

Example 16 includes the subject matter of example 9, wherein the instructions to generate the plurality of command variants are executed by the one or more processing units in parallel for two or more of the commands in the command registry.

Example 17 is Intelligent Personal Assistant (IPA)-enabled system, comprising: a display; a memory; and one or more processing units, communicatively coupled to the memory, wherein the memory stores instructions configured to cause the one or more processing units to: create a command registry, wherein each item in the command registry represents a command that the system is able to process; create an action registry, wherein each item in the action registry represents an action that the system is able to have performed; generate a plurality of command variants for each item in the command registry; store each of the generated command variants as documents in a document store; tag at least one of the stored command variants with an identification of at least one action from the action registry; receive a first command from a user; execute a search of the first command against the documents in the document store; determine a first plurality of search results based on the search of the document store, wherein each search result in the first plurality of search results is associated with a relevance score; select at least one search result from the first plurality of search results based, at least in part, on its respective relevance score; obtain an identification of at least one action that the selected at least one search result has been tagged with; and cause the system to have the identified at least one action performed.

Example 18 includes the subject matter of example 17, wherein the first command is not explicitly directed to a particular service provider or smart device.

Example 19 includes the subject matter of example 17, wherein the instructions are further configured to cause the one or more processing units to: create a search index for the document store.

Example 20 includes the subject matter of example 17, wherein the document store further comprises one or more documents, messages, or files of the user.

Example 21 includes the subject matter of example 17, wherein the instructions are further configured to cause the one or more processing units to: tag at least one of the stored command variants with an identification of at least one parsing grammar known to the system.

Example 22 includes the subject matter of example 21, wherein the system is configured to use the at least one known parsing grammar to parse the at least one stored command variant that has been tagged with the identification of at least one parsing grammar.

Example 23 includes the subject matter of example 17, wherein the instructions to select at least one search result from the first plurality of search results based, at least in part, on its respective relevance score further comprise instructions configured to cause the one or more processing units to: receive a selection from the user of a first one of the search results from among two or more search results having greater than a predetermined threshold level of relevancy.

Example 24 includes the subject matter of example 17, wherein the instructions to generate the plurality of command variants are executed by the one or more processing units in parallel for two or more of the commands in the command registry.

Example 25 includes the subject matter of example 17, wherein the plurality of generated command variants are personalized for the user.

It is to be understood that the above description is intended to be illustrative, and not restrictive. For example, above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled.

What is claimed is:

1. A computer-implemented method, comprising:
receiving a command from a user, wherein the command comprises one or more words in a text string;
determining, using a natural language processor having a machine learning model, a user intent of the command based on the one or more words and the text string, wherein the user intent is based on a previous command by the user, and wherein the machine learning model of the natural language processor is trained based on one or more command variants by a plurality of users;
executing a search of a document store for the one or more words of the text string and the intent, the document store comprising the one or more commands or command variants that an Intelligent Personal Assistant (IPA)-enabled system is able to process, wherein the one or more commands or the command variants is tagged with at least one action that the IPA-enabled system is able to perform;
determining a plurality of search results based on the search, wherein each search result in the plurality of search results is associated with a relevance score;
selecting at least one search result from the plurality of search results based, at least in part, on a respective relevance score for each of the at least one search result;
obtaining an identification of at least one action that the selected at least one search result has been tagged with;
generating, by the natural language processor, a variant of the command based on the user intent and the obtained identification; and
causing the IPA-enabled system to identify at least one action performed based on the variant.

2. The computer-implemented method of claim 1, wherein the command comprises a user text input, via typing or texts converted from spoken words, in a form of a sentence, a phrase, or an utterance.

3. The computer-implemented method of claim 1, wherein the plurality of search results comprises a location of the text string that was searched for and a number of occurrences of the text string.

4. The computer-implemented method of claim 1, wherein the plurality of search results comprises inexact matches to the text string, wherein the inexact matches are ranked based on applied language models, artificial intelligence, or one or more string-matching techniques.

5. The computer-implemented method of claim 1, wherein the plurality of search results comprises at least two or more search results with greater than a threshold level of relevance score, the computer-implemented method further comprising:
generating a prompt asking the user to resolve which of at least two actions associated with the at least two or more search results are more aligned with the user intent;
verifying with the user to determine the user intent; and
causing the IPA-enabled system to take one or more actions.

6. The computer-implemented method of claim 1, further comprising:
tagging at least one of the one or more command variants with an identification of at least one parsing grammar known to the IPA-enabled system, wherein the IPA-enabled system is configured to use the at least one known parsing grammar to parse the at least one of the one or more command variant that has been tagged with the identification of at least one parsing grammar.

7. The computer-implemented method of claim 1, wherein selecting at least one search result from the plurality of search results based, at least in part, on its respective relevance score further comprises:
receiving a selection from the user of a first one of the search results from among two or more search results having greater than a predetermined threshold level of relevancy.

8. The computer-implemented method of claim 1, wherein the command from the user is received at one of a messaging service, an internet of things (IoT) service, an intent determination service (IDS), one or more IoT handlers implemented as a software program or sub-program within a centralized communication system, or one or more autonomous connected devices from a list of smart thermostats, smart televisions, IP-enabled cameras, or home automation hubs.

9. A non-transitory computer readable medium comprising computer executable instructions stored thereon to cause one or more processing units to:
create a command registry, wherein each item in the command registry represents a command that an Intelligent Personal Assistant (IPA)-enabled system is able to process;
create an action registry, wherein each item in the action registry represents an action that the IPA-enabled system is able to have performed;
generate a plurality of command variants for each item in the command registry;
store each of the generated command variants as documents in a document store;
tag at least one of the stored command variants with an identification of at least one action from the action registry;
receive a command from a user, wherein the command comprises one or more words in a text string;
determine, using a natural language processor having a machine learning model, a user intent of the command based on the one or more words and the text string, wherein the user intent is based on a previous command by the user, and wherein the machine learning model of the natural language processor is trained based on the generated command variants;

execute a search in the document store for the one or more words of the text string and the intent;

determine a plurality of search results based on the search of the document store, wherein each search result in the plurality of search results is associated with a relevance score;

select at least one search result from the plurality of search results based, at least in part, on its respective relevance score;

obtain an identification of at least one action that the selected at least one search result has been tagged with;

generate, by the natural language processor, a variant of the command based on the user intent and the obtained identification; and cause the IPA-enabled system to identify at least one action performed based on the variant.

10. The non-transitory computer readable medium of claim 9, wherein the command comprises a user text input, via typing or texts converted from spoken words, in a form of a sentence, a phrase, or an utterance.

11. The non-transitory computer readable medium of claim 9, wherein the plurality of search results comprises a location of the text string that was searched for and a number of occurrences of the text string.

12. The non-transitory computer readable medium of claim 9, wherein the plurality of search results comprises inexact matches to the text string, wherein the inexact matches are ranked based on applied language models, artificial intelligence, or one or more string-matching techniques.

13. The non-transitory computer readable medium of claim 9, wherein the plurality of search results comprises at least two or more search results with greater than a threshold level of relevance score, and wherein the instructions further cause the one or more processing units to:

generate a prompt asking the user to resolve which of at least two actions associated with the at least two or more search results are more aligned with the user intent;

verify with the user to determine the user intent; and cause the IPA-enabled system to take one or more actions.

14. The non-transitory computer readable medium of claim 9, wherein the instructions to select at least one search result from the plurality of search results based, at least in part, on its respective relevance score further comprise instructions to cause the one or more processing units to:

receive a selection from the user of a first one of the search results from among two or more search results having greater than a predetermined threshold level of relevancy.

15. The non-transitory computer readable medium of claim 9, wherein the command from the user is received at one of a messaging service, an internet of things (IoT) service, an intent determination service (IDS), one or more IoT handlers implemented as a software program or sub-program within a centralized communication system, or one or more autonomous connected devices from a list of smart thermostats, smart televisions, IP-enabled cameras, or home automation hubs.

16. An Intelligent Personal Assistant (IPA)-enabled system, comprising:

a display;

a memory; and one or more processing units, communicatively coupled to the memory, wherein the memory stores instructions configured to cause the one or more processing units to:

receive a command from a user, wherein the command comprises one or more words in a text string;

determine, using a natural language processor having a machine learning model, a user intent of the command based on the one or more words and the text string, wherein the user intent is based on a previous command by the user, and wherein the machine learning model of the natural language processor is trained based on one or more command variants by a plurality of users;

execute a search of a document store for the one or more words of the text string and the intent, the document store comprising one or more commands or command variants that an Intelligent Personal Assistant (IPA)-enabled system is able to process, wherein the one or more commands or the command variants is tagged with at least one action that the IPA-enabled system is able to perform;

determine a plurality of search results based on the search of the document store, wherein each search result in the plurality of search results is associated with a relevance score;

select at least one search result from the plurality of search results based, at least in part, on a respective relevance score for each of the at least one search result;

obtain an identification of at least one action that the selected at least one search result has been tagged with;

generate, by the natural language processor, a variant of the command based on the user intent and the obtained identification; and cause the system to identify at least one action performed based on the variant.

17. The system of claim 16, wherein the command comprises a user text input, via typing or texts converted from spoken words, in a form of a sentence, a phrase, or an utterance.

18. The system of claim 16, wherein the plurality of search results comprises a location of the text string that was searched for and a number of occurrences of the text string, or comprises inexact matches to the text string, wherein the inexact matches are ranked based on applied language models, artificial intelligence, or one or more string-matching techniques.

19. The system of claim 16, wherein the plurality of search results comprises at least two or more search results with greater than a threshold level of relevance score, and wherein the instructions are further configured to cause the one or more processing units to:

generate a prompt asking the user to resolve which of at least two actions associated with the at least two or more search results are more aligned with the user intent;

verify with the user to determine the user intent; and cause the IPA-enabled system to take one or more actions.

20. The system of claim 16, wherein the command from the user is received at one of a messaging service, an internet of things (IoT) service, an intent determination service (IDS), one or more IoT handlers implemented as a software program or sub-program within a centralized communication system, or one or more autonomous connected devices from a list of smart thermostats, smart televisions, IP-enabled cameras, or home automation hubs.

* * * * *